United States Patent
Smith et al.

(10) Patent No.: US 9,749,806 B2
(45) Date of Patent: Aug. 29, 2017

(54) DETERMINING MOBILE DEVICE LOCATION BASED ON A PARTICLE SWARM APPROACH

(71) Applicant: Viavi Solutions UK Limited, Berkshire (GB)

(72) Inventors: Gareth James Smith, Berkshire (GB); Stefan Ulrich Thiel, Berkshire (GB)

(73) Assignee: Viavi Solutions UK Limited, Berkshire (GB)

( * ) Notice: Subject to any disclaimer, the term of this patent is extended or adjusted under 35 U.S.C. 154(b) by 0 days.

(21) Appl. No.: 14/972,934

(22) Filed: Dec. 17, 2015

(65) Prior Publication Data

US 2017/0180942 A1    Jun. 22, 2017

(51) Int. Cl.
H04W 4/02    (2009.01)
H04M 1/725    (2006.01)

(52) U.S. Cl.
CPC ....... *H04W 4/028* (2013.01); *H04M 1/72572* (2013.01)

(58) Field of Classification Search
CPC ........ H04W 4/02; H04W 64/00; H04W 4/025
See application file for complete search history.

(56) References Cited

U.S. PATENT DOCUMENTS

| 2011/0319100 | A1 | 12/2011 | Flanagan |
| 2013/0053056 | A1 | 2/2013 | Aggarwal et al. |
| 2016/0021637 | A1* | 1/2016 | Cao ...................... G01S 5/0278 455/440 |

FOREIGN PATENT DOCUMENTS

| EP | 1796419 | 6/2007 |
| EP | 2626719 A2 | 2/2013 |
| WO | WO 2012/009328 | 1/2012 |

OTHER PUBLICATIONS

Co-pending U.S. Appl. No. 15/073,247, filed Mar. 17, 2016 entitled "Automatic Optimization Procedure Termination Using a Smoothing-Based Technique," Smith et al., 54 pages.
Wikipedia, https://en.wikipedia.org/wiki/Multi-swarm_optimization, "Multi-swarm optimization", Dec. 8, 2014, 3 pages.
Wang et al., "Cooperative Velocity Updating Model based Particle Swarm Optimization", Applied Intelligence, Kluwer Academic Publishers, Dordrecht, NL, vol. 40, No. 2, Aug. 18, 2013, pp. 322-342.
European Search Report for European Application No. 16203891.3, dated May 2, 2017, 8 pages.

* cited by examiner

*Primary Examiner* — Nam Huynh
(74) *Attorney, Agent, or Firm* — Harrity & Harrity, LLP

(57) ABSTRACT

A device may include one or more processors. The device may obtain call information relating to a call. The call information may comprise a plurality of call segments. The device may perform one or more particle swarm operations to obtain approximate locations of the mobile device during at least some of the plurality of call segments. The device may combine the approximate locations to identify a location of the mobile device during the call.

20 Claims, 13 Drawing Sheets

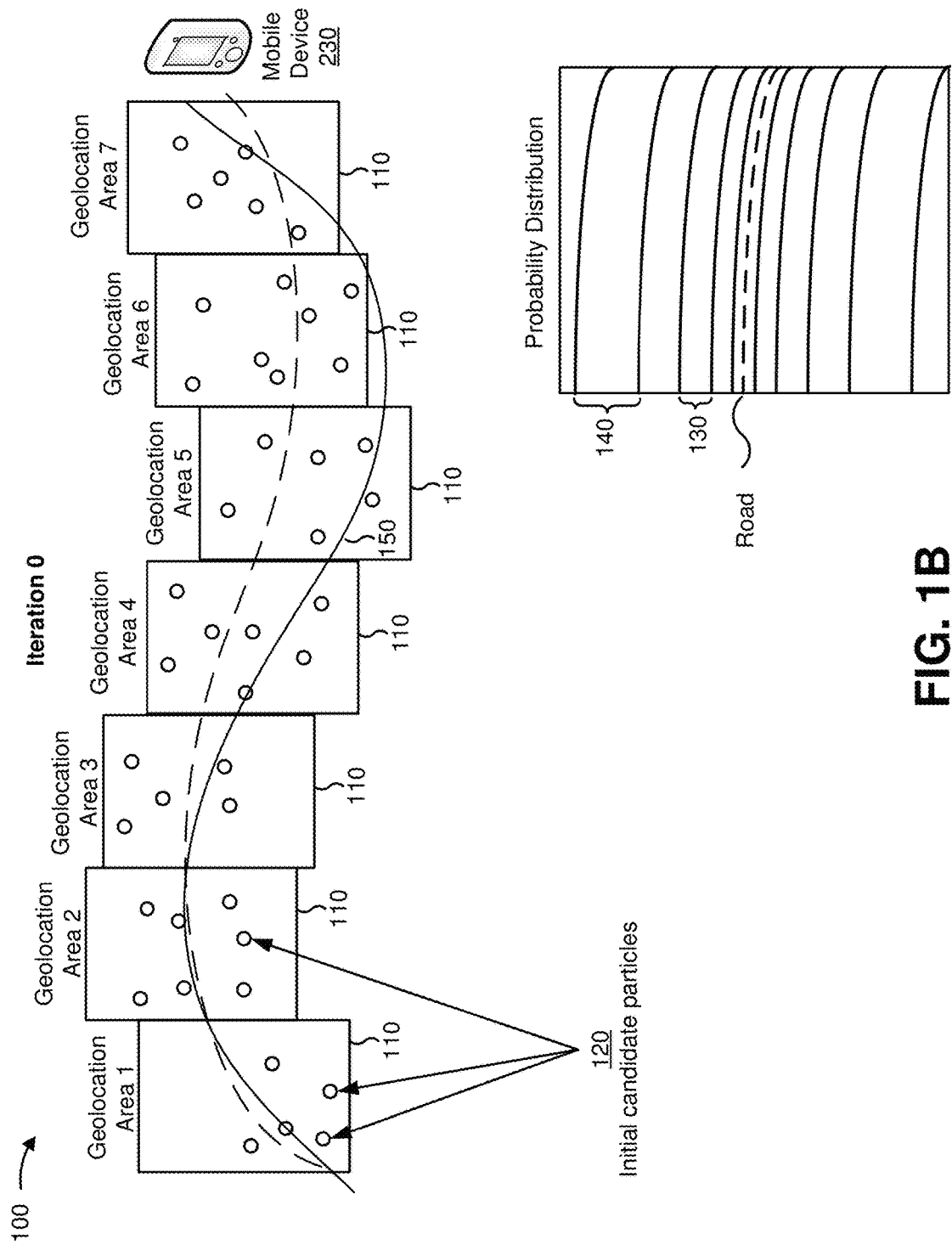

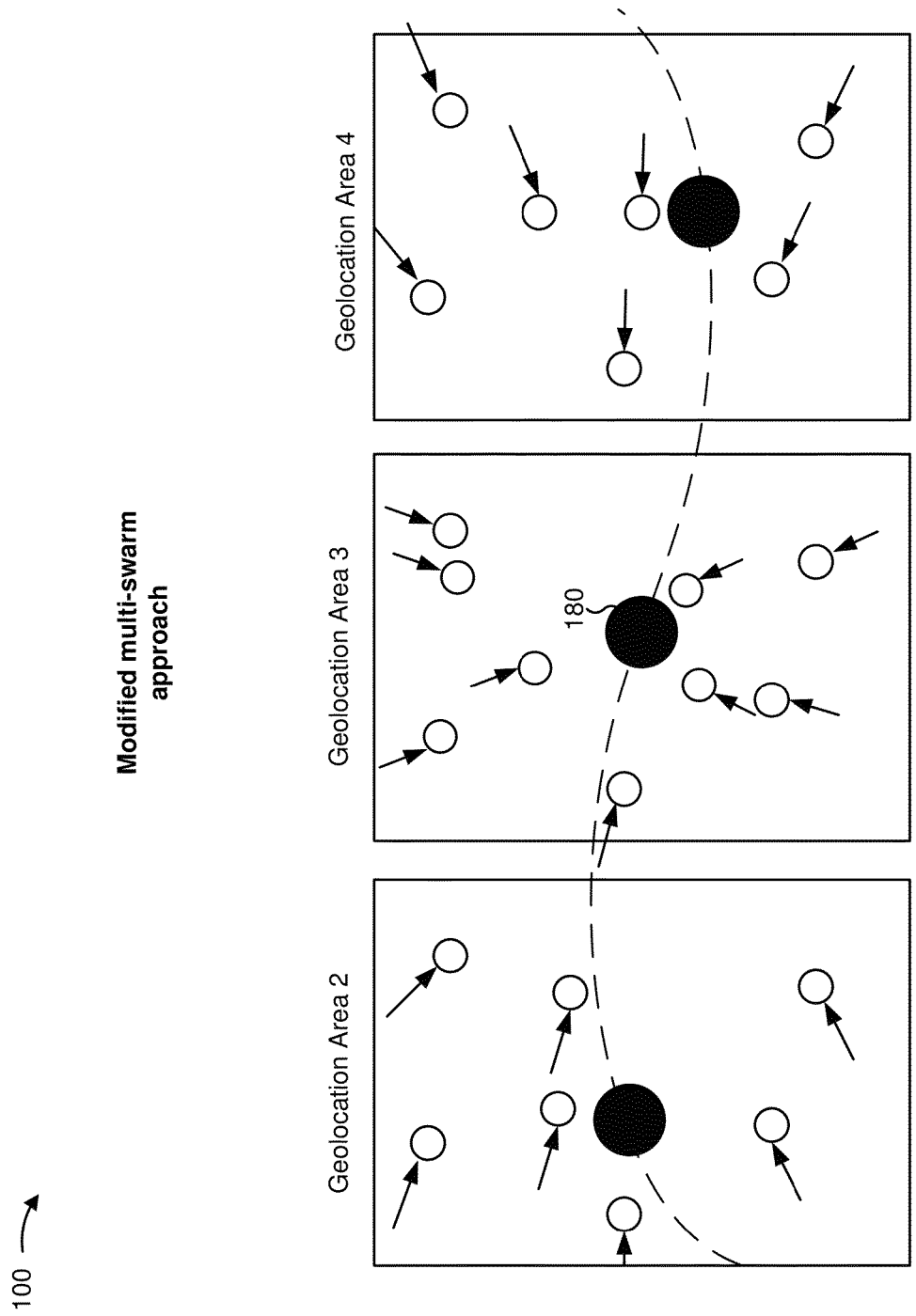

DETERMINING MOBILE DEVICE LOCATION BASED ON A PARTICLE SWARM APPROACH

BACKGROUND

A mobile device may place a call (e.g., a voice call, a video call, a Voice over IP (VoIP) call, a Voice over LTE (VoLTE) call, a data call, a web browsing session, a file transfer protocol (FTP) session, a file upload/download, etc.) via one or more base stations of a mobile network. In some cases, the mobile device may be approximately stationary throughout the call. In other cases, the mobile device may move during the call (e.g., may be located in a moving vehicle, may be held by a moving person, etc.). The call may be composed of one or more call segments. A network device associated with the mobile network may determine geolocation information that may identify approximate locations of the mobile device during the one or more call segments.

SUMMARY

According to some possible implementations, a device may include one or more processors. The one or more processors may obtain call information relating to a call. The call information may comprise a plurality of call segments. The one or more processors may perform one or more particle swarm operations to obtain approximate locations of a mobile device during at least some of the plurality of call segments. The one or more processors may combine the approximate locations to identify a location of the mobile device during the call.

According to some possible implementations, a non-transitory computer-readable medium may store one or more instructions, that, when executed by the one or more processors, may cause one or more processors to obtain call information relating to a call. The call information may comprise a plurality of call segments. The one or more instructions, when executed by the one or more processors, may cause the one or more processors to perform one or more particle swarm operations to obtain approximate locations of a mobile device that participated in the call during at least some of the plurality of call segments. The one or more instructions, when executed by the one or more processors, may cause the one or more processors to combine the approximate locations to identify a location of the mobile device during the call.

According to some possible implementations, a method may include obtaining, by a device, call information relating to the call. The call may comprise a plurality of call segments. The method may include determining, by the device and based on the call information, a plurality of geolocation areas corresponding to the plurality of call segments. The plurality of geolocation areas may identify respective geographical areas in which the mobile device was located during corresponding call segments of the plurality of call segments. The method may include generating, by the device and in the plurality of geolocation areas, respective pluralities of candidate particles for use to determine respective approximate locations. An approximate location, of the respective approximate locations, may identify an estimated location at which the mobile device was located during the corresponding call segment. The method may include determining, by the device, the approximate locations based on the respective pluralities of candidate particles. The approximate locations may be determined based on a particle swarm operation and based on a probability distribution may be associated with the plurality of geolocation areas. The method may include providing, by the device, information identifying the approximate locations and the corresponding plurality of call segments.

BRIEF DESCRIPTION OF THE DRAWINGS

FIGS. 1A-1E are diagrams of an overview of an example implementation described herein;

DETAILED DESCRIPTION

Figure 1A:
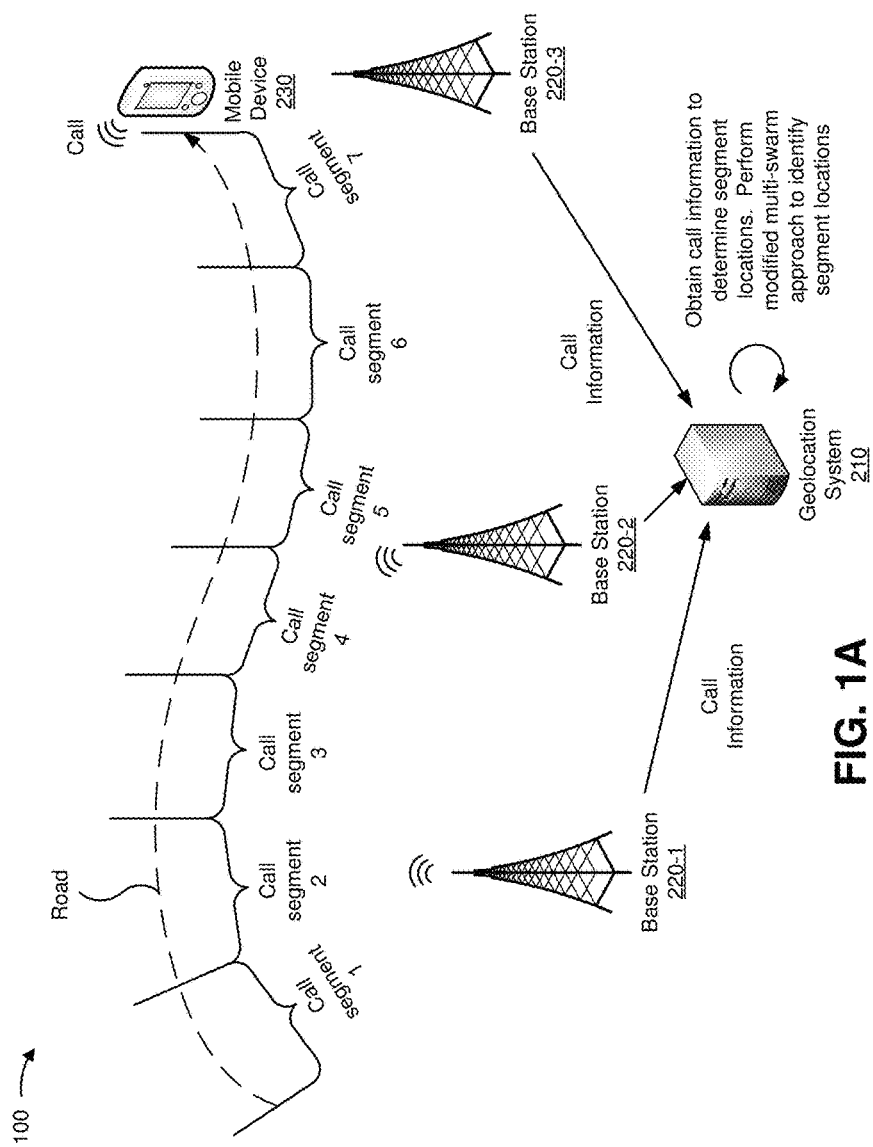

The following detailed description of example implementations refers to the accompanying drawings. The same reference numbers in different drawings may identify the same or similar elements.

A mobile device (sometimes also called a mobile unit, a user equipment, or the like) may place a call via a mobile network (e.g., a Global System for Mobile Communications (GSM) network, a Universal Mobile Telecommunications System (UMTS) network, a Long Term Evolution (LTE) network, etc.). The mobile network (e.g., a network resource of the mobile network) may divide the call into a set of call segments to process information relating to the call. In some cases, the mobile device may be moving during the call (e.g., based on being located in a car, etc.). Based on information obtained from network resources of the mobile network, a geolocator system may determine location information that identifies a set of segment locations corresponding to the set of call segments. For example, a segment location may identify an estimated location (e.g., an estimated geographical location) of the mobile device and/or an estimated velocity of the mobile device during a corresponding call segment.

However, in some cases, the location information may be insufficiently accurate. For example, in some cases, the geolocator system may use a propagation delay value (e.g., when the mobile network is a UMTS network), a timing advance value (e.g., when the mobile network is a UMTS network, an LTE network, or the like), a round trip delay value (e.g., when the mobile network is an LTE network), or the like, to determine the location information. In such cases, the location information may be less accurate than location information determined, for example, using a Global Positioning System (GPS) component of the mobile device. Furthermore, in some cases, when determining location information for a particular call segment, the geolocator system may not take into account location information for call segments neighboring the particular call segment, which further reduces accuracy of estimated geographical locations and causes a geographical path of the mobile device during the call to appear disjointed and/or non-continuous.

Implementations described herein enable a geolocator system to determine location information using one or more particle swarm operations and/or a modified multi-swarm approach, which improves accuracy of location information and smooths an estimated geographical path of a mobile device during a moving call, or identifies a single location of a static call. The geolocator system may determine geolocation areas that identify areas in which a mobile device was located for respective call segments of the call. The geolocator system may iteratively perform a swarm-based optimization approach (e.g., a particle swarm approach, a multi-swarm approach, etc.) to estimate segment location information identifying segment locations for the call segments within the geolocation areas.

In some implementations, the geolocator system may determine the segment locations based on a trend line that is generated and/or refined based on an estimated geographical path of the mobile device during the call, which improves accuracy of the geolocation process and increases correlation between neighboring segment locations. Further, the modified multi-swarm approach permits the geolocator system to take into account likely locations of the mobile device during neighboring call segments (e.g., a next call segment, a previous call segment, etc.) when determining an estimated geographical location for a particular call segment, which reduces differences between segment locations in neighboring geolocation areas.

In this way, the geolocator system improves accuracy of location information for calls that include multiple call segments. Based on the location information, a network operator may improve performance of the mobile network. For example, if a particular location (e.g., a particular road, tunnel, venue, etc.) is associated with an unusually high call volume, the network operator may deploy additional microcells, femtocells, or the like, in the particular location and/or may tune existing microcells/femtocells. As another example, if a first location and a second location associated with an unusually high quantity of calls moving from the first location to the second location, the network operator may deploy additional microcells, femtocells, or the like, between the first location and the second location and/or may tune existing microcells/femtocells.

Furthermore, the modified multi-swarm approach improves accuracy of an estimated trajectory of a moving call. Some network configuration procedures may be responsive to the estimated trajectory, and may therefore benefit from the increased accuracy. For example, the network operator may determine improved handover parameters based on geographical and/or temporal paths (e.g., estimated trajectories) of a set of mobile devices. As another example, the network operator may determine a particular set of ingress paths to an area of interest (e.g., a shopping center, a venue, a tunnel, etc.), and may configure devices, install advertising, etc. based on the particular set of ingress paths. As yet another example, the network operator may dynamically monitor estimated trajectories of crowds of mobile devices to predict concentrations of the crowds of mobile devices, and may perform configuration actions based on predicting the concentrations.

FIGS. 1A-1E are diagrams of an overview of an example implementation 100 described herein. As shown in FIG. 1A, a mobile device 230 may place a call (e.g., a voice call, a data call, etc.) via base stations 220-1 through 220-3 of a mobile network. As further shown, the mobile device 230 may be moving as the mobile device 230 conducts the call. For example, the mobile device 230 may be located in a moving vehicle that is driving along a road, or the like. This example is described with regard to a mobile device 230 moving along a road, but implementations described herein are not limited to mobile devices 230 moving along roads. The mobile device 230 may move through multiple, different serving cells, and may connect with multiple, different base stations 220-1 through 220-3 during the call.

As shown, the call may be divided into a set of seven call segments (e.g., Call segment 1, Call segment 2, Call segment 3, Call segment 4, Call segment 5, Call segment 6, and Call segment 7). As further shown, a geolocator system 210 may obtain call information identifying the set of call segments to determine segment locations corresponding to the set of call segments (e.g., based on measurement information associated with the set of call segments). Geolocator system 210, base station 220 and mobile device 230 are described in more detail in connection with FIG. 2, below. As further shown, to identify the segment locations, the geolocator system 210 may perform an analysis based on a modified multi-swarm approach, as described in more detail below.

As shown in FIG. 1B, and by reference number 110, to determine the segment locations, the geolocator system 210 (not shown) may determine a geolocation area corresponding to each call segment. For example, the geolocator system 210 may determine a geolocation area based on information identifying a cell in which the mobile device 230 was located during a call segment, based on measurement information relating to the mobile device 230, or the like. A geolocation area for a particular call segment may identify a geographical area in which the mobile device 230 was located during the particular call segment. Here, the geolocation areas are shown as rectangles arranged along the path of the mobile device 230. In some cases, the geolocation areas may be differently shaped, may overlap, may be separated by gaps, or the like.

As shown by reference number 120, in each geolocation area, the geolocator system 210 may generate a set of candidate particles (e.g., a swarm of multiple candidate particles) based on which to determine the segment locations. In some cases, the geolocator system 210 may generate the candidate particles randomly or pseudo-randomly. In other cases, the geolocator system 210 may generate the candidate particles based on probability distributions associated with the geolocation areas. An example probability distribution for a geolocation area, of the set of geolocation areas, is shown. As another example, a probability distribution may be visually represented by a heat map, or the like.

A probability distribution for a geolocation area may identify probability values corresponding to different points in a geolocation area. A probability value may identify a likelihood, at a corresponding point in the geolocation area and relative to other points in the geolocation area, that a mobile device 230 in the geolocation area is located at the corresponding point during a call segment. Here, areas in the probability distribution that are associated with high probability values are shown by lines that are closer together than areas that are associated with low probability values. For example, a point near the road may be associated with a higher probability value (e.g., based on the lines being closely spaced, as shown by reference number 130) than a point that is further from the road than the point near the road (e.g., based on the lines being less closely spaced, as shown by reference number 140).

The geolocator system 210 may assign scores to the candidate particles when performing the multi-swarm approach. A score for a particular particle may be determined based on one or more criteria, such as a probability value of the particular particle with regard to a probability distribution in a geolocation area, a combination of probability values with regard to multiple probability distributions, a combination of a probability value and a cellular network measurement, a trend line, as described in more detail below, or the like.

As shown by reference number 150, the geolocator system 210 may generate a trend line with regard to the candidate particles. For example, the geolocator system 210 may generate the candidate particles and may determine scores for the candidate particles. The geolocator system 210 may generate the trend line based on the scores associated with the candidate particles. For example, the geolocator system 210 may generate the trend line based on a respective best-scoring candidate particle for each geolocation area. The geolocator system 210 may perform the particle swarm operation, or a modified multi-swarm operation, based on the trend line. For example, the geolocator system 210 may use the trend line as an additional criterion for scoring particles, which improves accuracy of the particle swarm approach and reduces differences between segment locations of neighboring call segments.

Figure 1C:
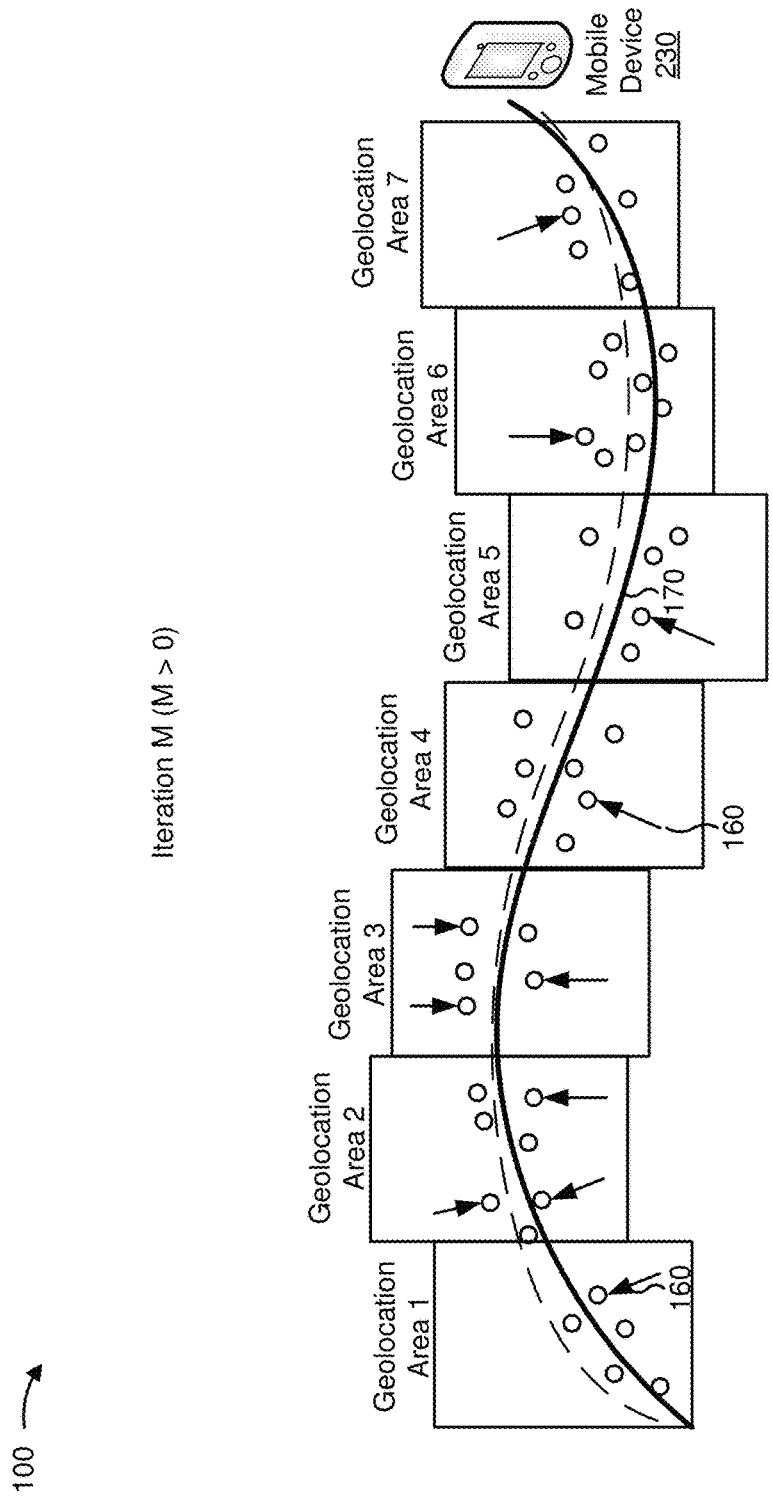

As shown in FIG. 1C, the geolocator system 210 (not shown) may perform iterations of the particle swarm approach. Here, the geolocator system 210 has performed a first quantity of iterations (e.g., represented by the variable M). As shown by reference number 160, the candidate particles in each geolocation area have moved closer to the road (e.g., the actual path taken by the mobile device 230). The candidate particles may move closer to the actual path based on the probability distributions for the set of geolocation areas and based on the trend line. For example, the geolocator system 210 may use the probability distributions and the trend line as criteria when selecting best-scoring particles for each iteration, and may assign velocities to other candidate particles, at each iteration and within each geolocation area, that cause the other candidate particles to move toward the best-scoring candidate particles in a next iteration.

As shown by reference number 170, the geolocator system 210 may adjust the trend line. For example, in each iteration, the geolocator system 210 may adjust the trend line based on updated locations of best-scoring candidate particles. In this way, the geolocator system 210 fits the trend line to best-scoring candidate particle locations, which further increases accuracy of the geolocation process.

FIG. 1D shows an example implementation of the modified multi-swarm approach. When performing the modified multi-swarm approach, geolocator system 210 may assign velocities to candidate particles based on best-scoring candidate particles in neighboring geolocation areas, as described in more detail below.

Assume that the geolocator system 210 determines a best-scoring candidate particle for Geolocation Area 3 based on the probability distribution. The best-scoring candidate particle for Geolocation Area 3 is shown here by reference number 180. As shown, the best-scoring candidate particle is located closer to an actual path of the mobile device 230 (e.g., the road) than any other candidate particle shown, and may therefore be associated with a best score of the scores associated with the shown candidate particles (e.g., based on the probability distribution).

As shown, based on the particle swarm approach, the geolocator system 210 may assign velocities that are directed toward the best-scoring particle to candidate particles included in Geolocation Area 3. As further shown, based on the modified multi-swarm approach, the geolocator system 210 may assign velocities that are directed toward the best-scoring candidate particle of Geolocation Area 3 to candidate particles included in neighboring geolocation areas (e.g., Geolocation Area 2 and Geolocation Area 4).

As shown, Geolocation Area 2 and Geolocation Area 4 also include respective best-scoring candidate particles. The geolocator system 210 may assign velocities that are directed toward the respective best-scoring candidate particles to candidate particles of Geolocation Area 3. Here, the velocities directed toward the respective best-scoring candidate particles are not shown for simplicity. In this way, the geolocator system 210 takes into account best-scoring particles of neighboring geolocation areas when determining segment locations, which improves accuracy of the geolocation process and improves correlation between segment locations in the neighboring geolocation areas.

Figure 1E:
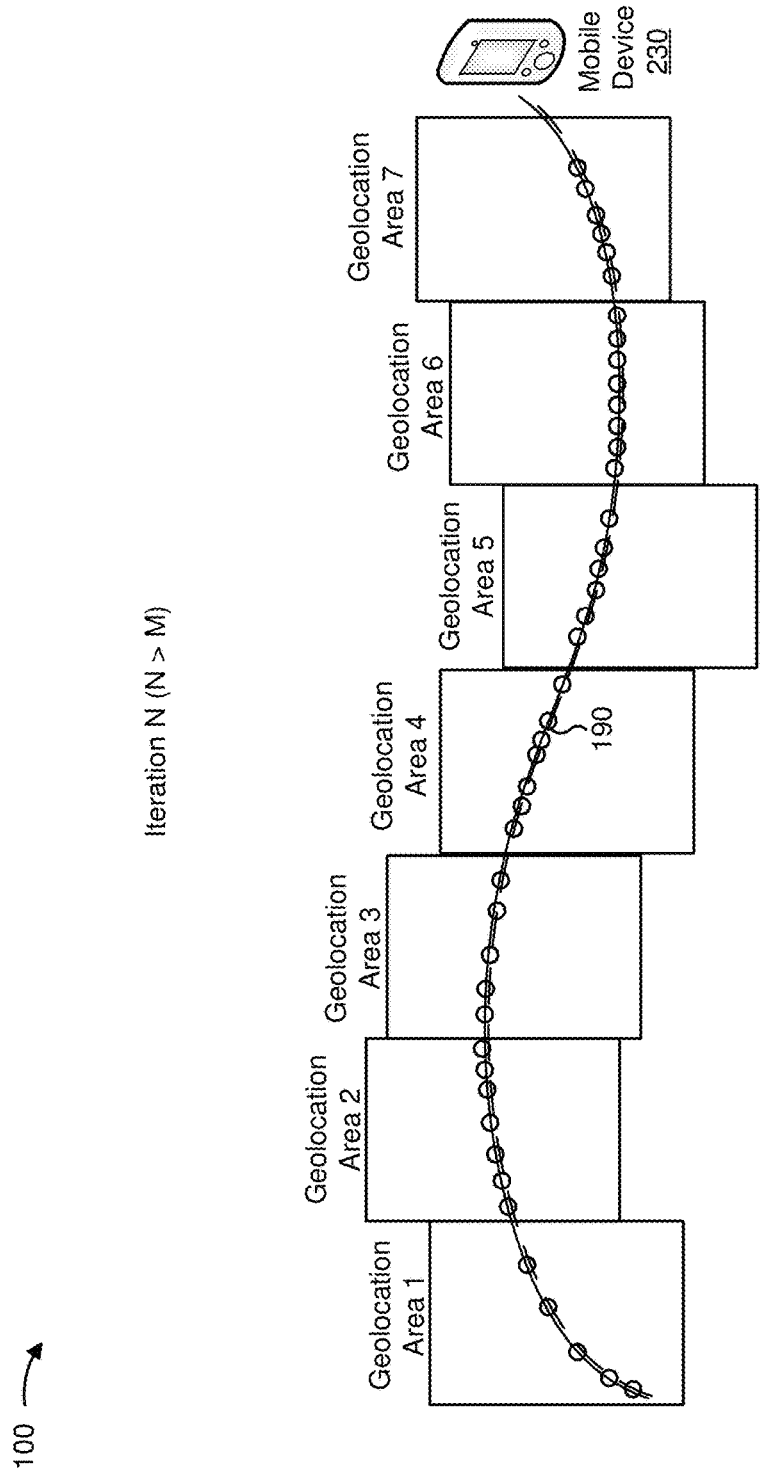

As shown in FIG. 1E, after a second quantity of iterations that is greater than the first quantity of iterations, the candidate particles may match, or may nearly match, the actual path of the mobile device 230. As shown by reference number 190, after the second quantity of iterations, the trend line may follow, or may nearly follow, the actual path of the mobile device 230. The geolocator system 210 may determine segment locations based on the candidate particles. For example, the geolocator system 210 may determine the segment locations based on a highest-scoring particle for each geolocation area/cell segment, based on an average location of candidate particles for each geolocation area/cell segment, or the like.

In this way, the geolocator system 210 improves accuracy of segment locations for calls that include multiple call segments. The geolocator system 210 may determine the segment locations based on a trend line that is generated and refined based on an estimated geographical path of the mobile device 230 during the call, which improves accuracy of the geolocation process and increases a degree to which segment locations of neighboring call segments are correlated. Further, the modified multi-swarm optimization approach permits the geolocator system 210 to take into account likely segment locations of neighboring call segments when determining an estimated geographical location for a particular call segment, which reduces differences between segment locations of neighboring call segments and improves accuracy of the geolocation process.

Figure 2:
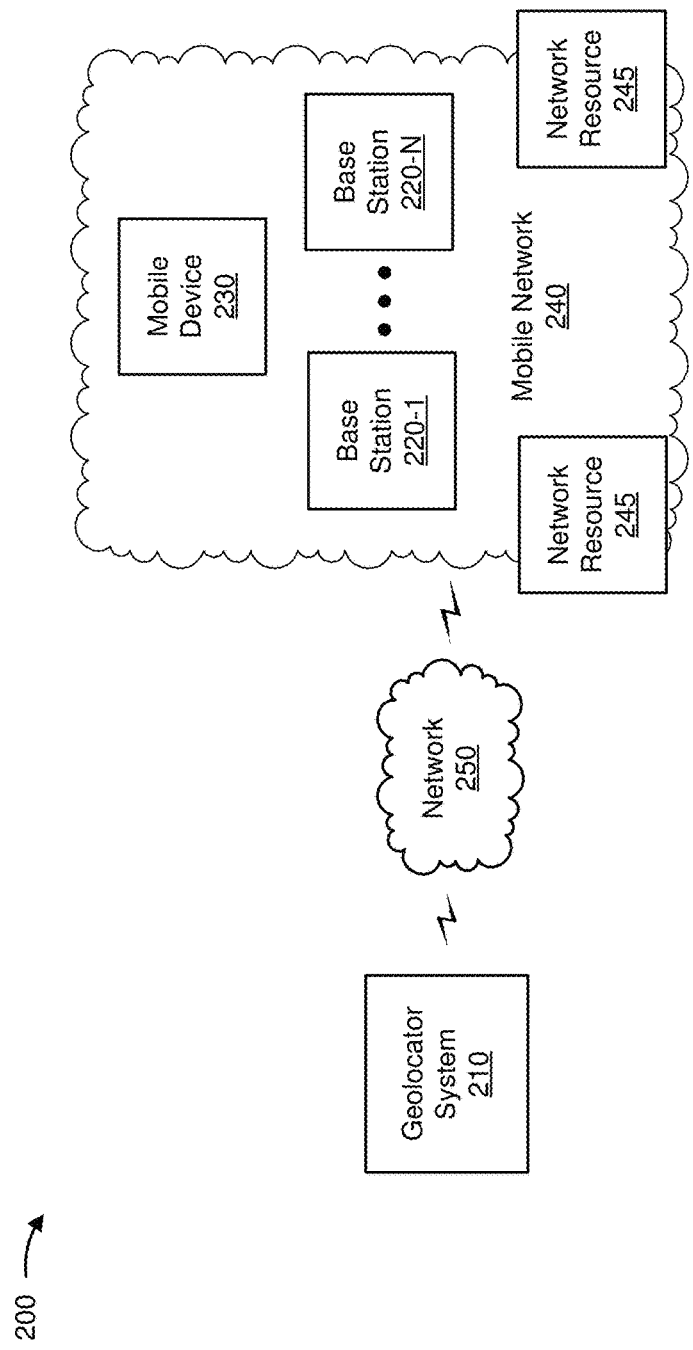
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a geolocator system 210, one or more base stations 220-1 through 220-N(N≥1) (hereinafter referred to individually as "base station 220," and collectively as "base stations 220"), a mobile device 230, a mobile network 240 with network resources 245, and a network 250. Devices of environment 200 may interconnect via wired connections, wireless connections, or a combination of wired and wireless connections.

Geolocator system 210 may include one or more devices capable of receiving, generating, storing, processing, and/or providing information, such as information described herein. For example, geolocator system 210 may include one or more computing devices, such as one or more server devices, desktop computers, workstation computers, virtual machines (VMs) provided in a cloud computing environment, or similar devices. In some implementations, geolocator system 210 may be utilized by an entity that manages and/or operates one or more portions of environment 200, such as, for example, a telecommunication service provider, a television service provider, an Internet service provider, or the like.

Base station 220 may include one or more devices capable of transferring traffic, such as audio, video, text, and/or other traffic, destined for and/or received from mobile device 230. In some implementations, base station 220 may include an eNB associated with a Long Term Evolution (LTE) network that receives traffic from and/or sends traffic to network 250. Additionally, or alternatively, one or more base stations 220 may be associated with a radio access network (RAN) that is not associated with the LTE network. Base station 220 may send traffic to and/or receive traffic from mobile device 230 via an air interface. In some implementations, base station 220 may include a small cell base station, such as a base station of a microcell, a picocell, and/or a femtocell. In some implementations, base station 220 may communicate with another base station 220 of mobile network 240 regarding measurement information, network performance information, or the like.

Mobile device 230 may include one or more devices capable of communicating with base station 220 and/or a network (e.g., mobile network 240, network 250, etc.). For example, mobile device 230 may include a wireless communication device, a radiotelephone, a personal communications system (PCS) terminal (e.g., that may combine a cellular radiotelephone with data processing and data communications capabilities), a smart phone, a smart meter, a wearable device (e.g., a smart watch or smart glasses), a vehicle, a laptop computer, a tablet computer, a personal gaming system, and/or a similar device. Mobile device 230 may send traffic to and/or receive traffic from network 250 (e.g., via base station 220).

Mobile network 240 may include a mobile communications network, such as a 3G mobile network, a 4G mobile network, a 5G mobile network, a heterogeneous network, a Global System for Mobile Communications (GSM) mobile network, and/or a combination of these or other types of networks. In some implementations, mobile network 240 may correspond to an evolved packet system (EPS), a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may include a base station (eNB). The EPC network may include a mobility management entity (MME), a serving gateway (SGW), a policy and charging rules function (PCRF), a PDN gateway (PGW), a base station controller (BSC), a radio network controller (RNC), an operations and maintenance centre (OMC), a network management system (NMS), an operations support system (OSS), and/or a network management center (NMC). The IMS network may include a home subscriber server (HSS), a proxy call session control function (P-CSCF), an interrogating call session control function (I-CSCF), and a serving call session control function (S-CSCF).

In some implementations, mobile network 240 may include one or more network resources 245, such as, for example, the eNB, the MME, the SGW, the PCRF, the PGW, the HSS, the P-CSCF, the I-CSCF, the S-CSCF, or the like.

Network 250 may include one or more wired and/or wireless networks. For example, network 250 may include a mobile network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a cloud computing network, a private network, and/or a combination of these or other types of networks. In some implementations, network 250 may include one or more device-to-device wireless networks where communication may occur through direct communication between devices, under the control of network 250 or independently. In some implementations, direct device-to-device links may comprise one or more hops. Such direct device-to-device links may be used in a cooperative manner together with point-to-point and/or point-to-multi-point links mediated by network 250.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
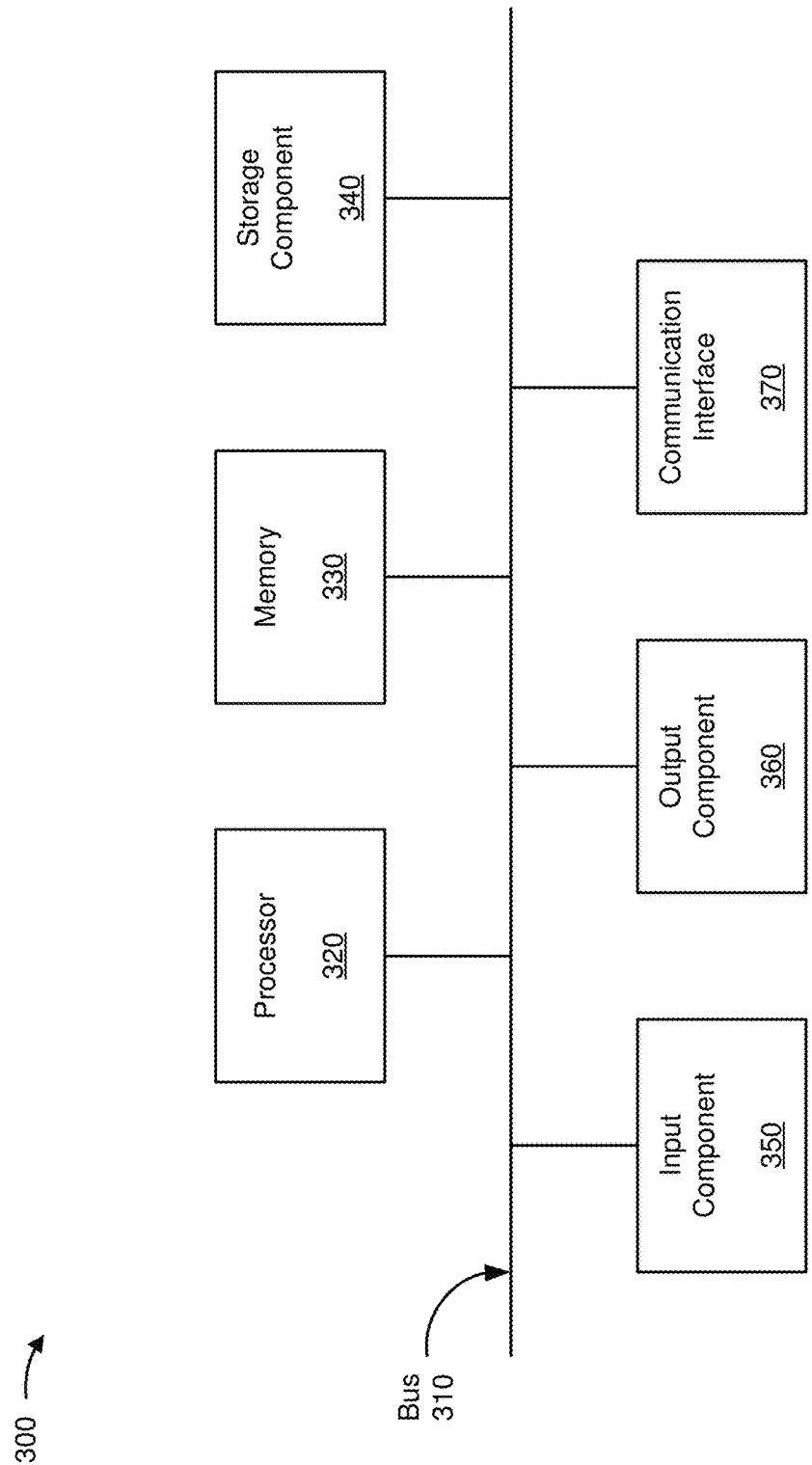
FIG. 3 is a diagram of example components of one or more devices of FIG. 2.

FIG. 3 is a diagram of example components of a device 300. Device 300 may correspond to geolocator system 210, base station 220, mobile device 230, and/or network resource 245. In some implementations, geolocator system 210, base station 220, mobile device 230, and/or network resource 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
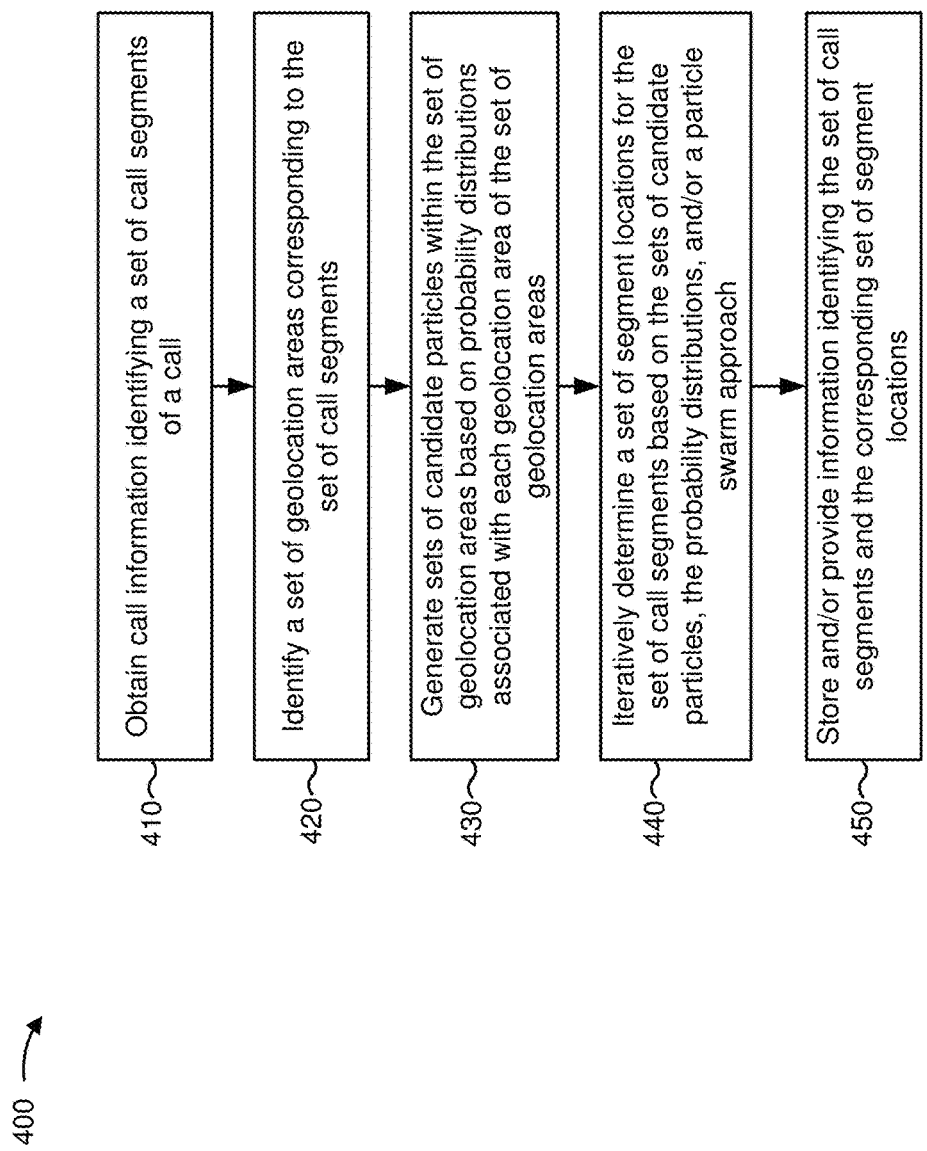
FIG. 4 is a flow chart of an example process for determining segment locations of call segments based on a particle swarm approach.

FIG. 4 is a flow chart of an example process 400 for determining segment locations of call segments based on a modified multi-swarm approach. In some implementations, one or more process blocks of FIG. 4 may be performed by geolocator system 210. In some implementations, one or more process blocks of FIG. 4 may be performed by another device or a group of devices separate from or including geolocator system 210, such as base station 220, mobile device 230, and/or network resource 245.

As shown in FIG. 4, process 400 may include obtaining call information identifying a set of call segments of a call (block 410). For example, geolocator system 210 may obtain call information associated with a call placed by mobile device 230. The call information may identify a set of call segments included in the call. For example, network resources 245 may divide the call into a set of call segments in order to process and/or analyze the call. In some implementations, geolocator system 210 may divide the call into a set of call segments (e.g., based on a particular length of time, a particular quantity of data transmitted, a transition from a first serving cell and/or base station 220 to a second serving cell and/or base station 220, etc.).

The call may include a voice call, a video call, a VoIP call, a VoLTE call, a data session, or the like. In some implementations, geolocator system 210 may obtain the call information periodically (e.g., once per minute, once per hour, once per day, etc.). Additionally, or alternatively, geolocator system 210 may receive the call information based on the call being terminated.

In some cases, mobile device 230 may be stationary, or substantially stationary, during the call. For example, mobile device 230 may be used by a pedestrian, may be fixed in place, or the like. In other cases, mobile device 230 may be moving during the call. For example, mobile device 230 may be located in a moving car, a train, a bus, or the like. Geolocator system 210 may determine whether mobile device 230 satisfies a movement threshold based on whether mobile device 230 is stationary, substantially stationary, or moving, as described in more detail elsewhere herein.

In some implementations, geolocator system 210 may obtain the call information from network resource 245. For example, one or more base stations 220 via which mobile device 230 conducts the call may provide call information to network resource 245. The call information for a particular call segment may include information identifying the particular call segment, a length of the particular call segment, one or more base stations 220 to which mobile device 230 was connected during the call segment, or the like.

In some implementations, the call information may include measurement information referring to one or more base stations 220. For example, the call information for a particular call segment may identify a propagation delay value, a timing advance value, a round trip delay value, or the like, which may identify a minimum and/or maximum distance between base station 220 and mobile device 230. As another example, the call information for a particular call segment may identify a received signal code power (RSCP) associated with mobile device 230, a downlink received energy per chip (Ec) for mobile device 230, a downlink noise power density (NO) for mobile device 230, a received signal reference quality (RSRQ) for mobile device 230, a received signal level (RxLev) value for mobile device 230, a timing measure (TM) value, a beam width associated with base station 220, or the like. Geolocator system 210 may use the measurement information to determine a geolocation area for the particular call segment, as described in more detail below.

As further shown in FIG. 4, process 400 may include identifying a set of geolocation areas corresponding to the set of call segments (block 420). For example, geolocator system 210 may identify a set of geolocation areas corresponding to the set of call segments. A geolocation area may identify a geographical area within which mobile device 230 is likely to be located, or was located, during a particular call segment. Geolocator system 210 may identify the set of geolocation areas based on the call information associated with the set of call segments.

In some implementations, geolocator system 210 may identify a different geolocation area for each call segment of a call, which improves accuracy of the geolocation process. In some implementations, geolocator system 210 may identify a geolocation area that includes multiple, adjacent call segments, which may conserve processor resources of geolocator system 210 by reducing a quantity of geolocation areas to process.

In some implementations, geolocator system 210 may determine a geolocation area based on a propagation delay, a timing advance, a round trip delay value, or the like. For example, geolocator system 210 may determine a maximum radius and/or a minimum radius of a distance between base station 220 and mobile device 230 based on the propagation delay, the timing advance, the round trip delay value, or the like. Based on the maximum radius and/or the minimum radius, geolocator system 210 may determine the geolocation area. For example, the geolocation area may include a circle of the maximum radius, may include a geographical area between the maximum radius and the minimum radius, or the like. In some implementations, geolocator system 210 may determine the geolocation area to include a maximum transmit range of base station 220 and/or mobile device 230.

In some implementations, geolocator system 210 may determine a geolocation area based on locations of base stations 220. For example, mobile device 230 may place a call segment via a particular base station 220. The particular base station 220 may be located near adjacent base stations 220. Geolocator system 210 may determine the geolocation area based on locations of the particular base station 220 and the adjacent base stations 220. For example, geolocator system 210 may determine an average distance between the particular base station 220 and the adjacent base stations 220, and may determine a geolocation area that includes a circle with a radius of a multiple of the average distance. As another example, geolocator system 210 may determine coverage areas of the particular base station 220 and the adjacent base stations 220, and may determine a geolocation area that is covered by the particular base station 220 and not the adjacent base stations 220.

In some implementations, geolocator system 210 may determine a geolocation area based on multiple serving cells that are associated with a particular base station 220. For example, in some cases, mobile device 230 may move from a first serving cell provided by the particular base station 220 to a second serving cell provided by the particular base station 220 (e.g., during a single call segment, during two or more call segments, etc.). In such a case, geolocator system 210 may determine a geolocation area based on the first serving cell and the second serving cell. For example, geolocator system 210 may determine a geolocation area that includes part of the first serving cell and part of the second serving cell (e.g., based on Ec/NO values associated with mobile device 230, based on RSRQ values associated with mobile device 230, based on received power values associated with mobile device 230, based on interference values (e.g., a signal to interference plus noise (SINR) ratio observed by mobile device 230), etc.).

In some implementations, geolocator system 210 may determine a geolocation area based on two or more serving cells that are associated with two or more base stations 220. For example, in a situation where mobile device 230 is associated with a first base station 220-1 and a second base station 220-2 (e.g., where mobile device 230 is covered by the first base station 220-1 and the second base station 220-2, where mobile device 230 moves from a coverage area of the first base station 220-1 to the second base station 220-2, etc.), geolocator system 210 may determine a geolocation area based on the first base station 220-1 and the second base station 220-2.

For example, geolocator system 210 may use power levels (e.g., RSCP values, RSRP values, RxLev values, etc.) of signals associated with the first base station 220-1 and the second base station 220-2, as measured by mobile device 230, to determine the geolocation area. In a situation where the first base station 220-1 is associated with a higher power level than the second base station 220-2, mobile device 230 may determine a geolocation area that includes more of a coverage area of the first base station 220-1 than the second base station 220-2, or that is closer to the first base station 220-1 than the second base station 220-2, that follows a line from first base station 220-1 to the second base station 220-2 which corresponds to the difference in power, or the like.

In some implementations, geolocator system 210 may determine whether mobile device 230 satisfies a movement threshold based on the call information. For example, in a situation where the call information indicates that mobile device 230 has connected with a threshold quantity of base stations 220, has traveled through a threshold quantity of serving cells, has connected with a threshold quantity of base stations 220 and/or traveled through a threshold quantity of cells in a particular length of time, has traveled a threshold distance, or the like, geolocator system 210 may determine that mobile device 230 satisfies a movement threshold.

When mobile device 230 satisfies a movement threshold (i.e., when mobile device 230 is likely to have moved a threshold distance during the call), geolocator system 210 may determine a location of mobile device 230 based on a modified multi-swarm approach and/or a trend line, as described in more detail below. When mobile device 230 does not satisfy a movement threshold (e.g., when mobile device 230 is not likely to have moved a threshold distance during the call), mobile device 230 may determine a location of mobile device 230 based on a particle swarm approach and/or a single location, as described in more detail below.

As further shown in FIG. 4, process 400 may include generating sets of candidate particles within the set of geolocation areas based on probability distributions associated with each geolocation area of the set of geolocation areas (block 430). For example, geolocator system 210 may generate sets of candidate particles corresponding to (e.g., within) a set of geolocation areas corresponding to a call. Geolocator system 210 may generate the sets of candidate particles to determine segment locations associated with the call segments based on a particle swarm approach and/or a multi-swarm approach, as described in more detail below.

In some implementations, geolocator system 210 may generate a set of candidate particles (e.g., a swarm) for each geolocation area. A set of candidate particles may include, for example, 5 candidate particles, 10 candidate particles, 20 candidate particles, or the like. By using a lesser quantity of candidate particles, geolocator system 210 reduces processor usage associated with each iteration of the geolocation process. By using a greater quantity of candidate particles, geolocator system 210 reduces a quantity of iterations needed to determine segment locations. In some implementations, the quantity of candidate particles used in a particular determination of call segments may be user configurable. In some implementations, the quantity of candidate particles may be based on information relating to a particular call. For example, the quantity of candidate particles may be based on the quantity of call segments for the particular call, a particular geographic area in which the particular call occurred, etc. In some implementations, the quantity of candidate particles may be different for different call segments of a particular call.

Geolocator system 210 may generate a set of candidate particles based on a probability distribution associated with a corresponding geolocation area in which the set of candidate particles is generated. Geolocator system 210 may generate candidate particles in locations that are associated with higher probability values (e.g., non-zero probability values, probability values that satisfy a threshold, etc.), as compared to locations that are associated with lower probability values, which conserves processor resources by reducing a quantity of iterations required to determine segment locations. In some implementations, geolocator system 210 may place candidate particles based on a random modifier. For example, geolocator system 210 may generate a candidate particle at a particular location based on a probability distribution, and may displace the candidate particle by a random distance and/or in a random direction from the particular location, which increases randomness of the candidate particles and thereby improves accuracy of the particle swarm approach.

In some implementations, the probability distribution may be determined based on past cellular usage in the geolocation area, based on cellular usage during a call segment associated with the geolocation area, based on cellular measurements taken in the geolocation area, based on analysis of one or more base stations 220 by geolocator system 210, or the like. In some implementations, geolocator system 210 may combine multiple, different probability distributions for a geolocation area into a composite probability distribution, and may use the composite probability distribution to generate the set of candidate particles. For example, geolocator system 210 may combine a probability distribution relating to a road layout in a geolocation area, with a probability distribution relating to cellular usage at different times of day in the geolocation area.

In some implementations, geolocator system 210 may use a particular probability distribution based on whether a call satisfies a movement threshold. For example, the movement threshold may be configured such that a call placed by a pedestrian (e.g., a person that is not in a moving vehicle) is unlikely to satisfy the movement threshold. In such a case, when a call satisfies the movement threshold, geolocator system 210 may use a probability distribution based on a road layout in the geolocation area (e.g., as shown in FIG. 5B). In a case where a call does not satisfy the movement threshold, geolocator system 210 may use a different probability distribution (e.g., a probability distribution that is associated with mobile devices 230 used by pedestrians, etc.). In this way, geolocator system 210 improves accuracy of the probability distribution based on the movement threshold, which conserves processor resources by conserving a quantity of iterations needed to determine a segment location, and which improves accuracy of the geolocation process.

As further shown in FIG. 4, process 400 may include iteratively determining a set of segment locations for the set of call segments based on the sets of candidate particles, the probability distributions, and/or a particle swarm approach (block 440). For example, based on the set of candidate particles and the probability distributions corresponding to the set of candidate particles, geolocator system 210 may iteratively determine a set of segment locations. To determine the set of segment locations, geolocator system 210 may perform a particle swarm approach, a multi-swarm approach, and/or a modified multi-swarm approach, as described in more detail below. A segment location may identify a location and/or velocity associated with a particular call segment (e.g., based on mobile device 230 being likely to be located at and/or moving at the location and/or velocity during the particular call segment).

In some implementations, geolocator system 210 may determine a segment location based on a particle swarm approach. The particle swarm approach may be a method of iteratively identifying a point, in a particular space and using a set of candidate particles in the particular space, that provides a particular score (e.g., a highest score, a score that satisfies a threshold, etc.) based on one or more criteria. In a first iteration of the particle swarm approach, geolocator system 210 may generate a set of candidate particles based on one or more probability distributions and/or based on a random operation. Geolocator system 210 may select a particular candidate particle, of the set of candidate particles, based on one or more criteria. For example, geolocator system 210 may use the probability distribution as the one or more criteria, may use a combination of probability distributions as the one or more criteria, or the like. Geolocator system 210 may determine scores of each candidate particle, of the candidate particles, based on the one or more criteria, and may select the particular candidate particle based on the scores (e.g., may select a best-scoring candidate particle).

In a second iteration of the particle swarm approach, geolocator system 210 may assign velocities and/or displacements to other candidate particles (e.g., other than the selected candidate particle), that may cause the other candidate particles to move toward the selected candidate particle. In some implementations, geolocator system 210 may assign a random velocity and/or displacement to the selected candidate particle (e.g., to determine whether the selected candidate particle moves to a superior location based on the one or more criteria) or to the other points (e.g., to determine if another point can be positioned at a better location than the best point). Geolocator system 210 may apply the velocities and/or displacements, and may determine scores based on the one or more criteria to select a best point for the second iteration.

Geolocator system 210 may iteratively perform the operations described above (e.g., may select a best-scoring candidate particle of a set of generated candidate particles, may assign velocities and/or displacements to candidate particles based on the best-scoring candidate particle, may displace the candidate particles based on the velocities and/or displacements, etc.) until geolocator system 210 determines a local solution (e.g., a location of a best-scoring candidate particle, an average location of a set of candidate particles, etc.) for the space. Here, the local solution may correspond to a segment location for a particular call segment, and the space may correspond to a geolocation area. Geolocator system 210 may determine that a local solution has been determined based on a predefined quantity of iterations being performed, based on a distance between one or more candidate particles in a first iteration and a second iteration, based on velocities of candidate particles at a particular iteration, based on a threshold score being determined, or the like. In this way, geolocator system 210 performs a particle swarm operation to determine a local solution for a space.

In some implementations, geolocator system 210 may perform a multi-swarm approach to determine the segment locations. A multi-swarm approach may be a variation of the particle swarm approach that uses multiple sets of candidate particles (e.g., multiple swarms) in multiple spaces (e.g., multiple geolocation areas) to find local solutions in one or more of the multiple spaces by performing the particle swarm approach with regard to the multiple spaces. When geolocator system 210 finds a local solution for a set of candidate particles in a first space based on the particle swarm approach, one or more candidate particles of the set may be displaced to a second space, and geolocator system 210 may iteratively determine a local solution in the second space based on the particle swarm approach. In this way, geolocator system 210 can determine local solutions (e.g., segment locations) in multiple solution spaces (e.g., multiple geolocation areas) using the multi-swarm approach.

In some implementations, geolocator system 210 may use a modified multi-swarm approach to determine segment locations for a call. In the modified multi-swarm approach, a best-scoring candidate particle in a particular geolocation area may affect velocities and/or displacements of candidate particles in neighboring geolocation areas. For example, based on the modified multi-swarm approach, geolocator system 210 may assign particular velocities and/or displacements to candidate particles in a particular geolocation area based on selected (e.g., best-scoring) candidate particles in neighboring geolocation areas. The particular velocities and/or displacements may be directed to locations of the selected candidate particles in the neighboring geolocation areas.

In this way, geolocator system 210 improves accuracy of geolocation for call segments, generates smoother geolocation paths for the call segments, and conserves processor and battery resources of geolocator system 210, base station 220, and/or mobile device 230 by determining geolocation information without resorting to costlier methods (e.g., obtaining GPS information, etc.).

As one possible example, geolocator system 210 may place sets of candidate particles corresponding to each geolocation area (e.g., each call segment) of a call. For each iteration of the modified multi-swarm approach, geolocator system 210 may assign a velocity to a particle based on the below equation:

$$V_{i+1}=W_v \cdot V_i + R_I \cdot W_I \cdot (p_I - p) + R_g \cdot W_g \cdot (p_g - p) + R_{n+1} \cdot W_{n+1} \cdot (p_{n+1} - p) + R_{n-1} \cdot W_{n-1} \cdot (p_{n-1} - p),$$ where $W_v$=Velocity inertia weight,
$W_I$=Attraction to best position found by particle,
$W_g$=Attraction towards best scoring particle in swarm,
$W_{n+1}$=Attraction to best scoring particle in next neighboring space,
$W_{n-1}$=Attraction to best scoring particle in previous neighboring space,
$V_i$=Current velocity of particle (e.g., assigned in previous iteration),
$V_{i+1}$=Assigned velocity for current iteration,
p=Current location of particle,
$p_I$=Location of best position found by particle,
$p_g$=Location of best scoring particle in swarm,
$p_{n+1}$=Position of best scoring particle in next neighboring space,
$p_{n-1}$=Position of best scoring particle in previous neighboring space,
$R_I$=Random component for the particle,
$R_g$=Random component for the swarm,
$R_{n+1}$=Random component for next neighboring space, and
$R_{n-1}$=Random component for previous neighboring space.

In some cases, the constants in the above equation (e.g., $W_v$, $W_I$, $W_g$, $W_{n+1}$, and/or $W_{n-1}$) may be assigned particular values. As one possible example, $W_v$ may be assigned a value of approximately 0.729, $W_I$ may be assigned a value of approximately 1.49445, $W_g$ may be assigned a value of approximately 1.49445, $W_{n+1}$ may be assigned a value of approximately 0.3645, and/or $W_{n-1}$ may be assigned a value of approximately 0.3645. In some implementations, the random components may be randomly or pseudo-randomly assigned (e.g., in a range between approximately 0 and approximately 1, at each iteration, after a particular quantity of iterations, etc.). In some implementations, the constants and/or the random values may be assigned different values and/or ranges than the values and/or ranges described above (e.g., higher values and/or ranges, lower values and/or ranges, etc.).

Based on the above equation, geolocator system 210 may determine local solutions (e.g., segment locations) in each space (e.g., geolocation area) of a set of spaces (e.g., each geolocation area of a set of geolocation areas for a call). Geolocator system 210 may determine the local solution for a particular space based on scores of particles associated with the particular space during each iteration. The scores may be determined based on one or more criteria (e.g., probability distributions, trend lines, etc.) associated with the particular space. In a situation where a particle is at a location that is associated with a high probability, the particle may receive a higher score than another particle that is at a location that is associated with a low probability.

In some implementations, geolocator system 210 may generate a trend line with regard to multiple sets of candidate particles (e.g., multiple swarms), and may perform a modified multi-swarm operation based on the trend line. For example, geolocator system 210 may select, in a particular iteration, multiple candidate particles corresponding to respective spaces, of a set of spaces (e.g., based on scores associated with the selected candidate particles being better than scores associated with other candidate particles of the set of spaces), and may generate a trend line based on the set of selected candidate particles. The trend line, for example, may connect the selected candidate particles, may be placed near the selected candidate particles, or the like.

Geolocator system 210 may use the trend line as a criterion for scoring and/or selecting candidate particles as best candidate particles. For example, candidate particles that are located closer to the trend line may be assigned higher scores than candidate particles that are located further from the trend line. In this way, geolocator system 210 causes candidate particles to move toward the trend line in the multi-swarm approach, which increases a degree to which neighboring cell segments influence the determination of segment locations of each cell segment, thereby increasing accuracy of the geolocation process.

In some implementations, geolocator system 210 may adjust a trend line based on a result of an iteration. For example, assume that geolocator system 210 generates the trend line based on a set of selected (e.g., best-scoring) candidate particles. In a situation where one or more of the selected candidate particles changes (e.g., a location of the one or more selected candidate particles) and/or where geolocator system 210 selects different candidate particles after an iteration, geolocator system 210 may move the trend line based on the change and/or the different candidate particles.

In some implementations, geolocator system 210 may adjust a trend line based on a coefficient indicating a sensitivity of the trend line to changes in the location of the selected candidate particles. For example, when the coefficient is assigned a relatively low value, geolocator system 210 may generate the trend line to fit selected candidate particle locations more closely than when the coefficient is assigned a relatively high value. In some implementations, geolocator system 210 may decrease a value of the coefficient as geolocator system 210 performs an increasing quantity of iterations. In this way, geolocator system 210 causes the trend line to fit a set of selected candidate particles more closely in later iterations of the multi-swarm approach, which improves fit of the trend line with regard to the selected candidate particles as the selected candidate particles approach likely segment locations.

In some implementations, when mobile device 230 does not satisfy a movement threshold, geolocator system 210 may generate a trend point. For example, geolocator system 210 may determine a selected candidate particle for each call segment of a stationary call, and may generate the trend point based on locations associated with the selected candidate particles (e.g., an average location of the selected candidate particles, a weighted average location of the selected candidate particles, etc.). Geolocator system 210 may use the trend point to score candidate particles (e.g., based on a proximity of the candidate particles to the trend point). In this way, geolocator system 210 improves accuracy of geolocation of stationary, or substantially stationary, calls and increases a degree to which neighboring call segments co-influence location information.

In some implementations, geolocator system 210 may adjust a location of a trend point. For example, after a first iteration of a particle swarm operation, geolocator system 210 may select a selected (e.g., highest scoring) particle for each call segment of a call based on a trend point. Geolocator system 210 may move the trend point based on locations of the selected particles. For example, geolocator system 210 may move the trend point to an average location of the selected particles, may move the trend point toward the average location, or the like. After a second iteration based on the new location of the trend point, geolocator system 210 may select new selected particles based on the new location of the trend point, and may adjust the location of the trend point. In this way, geolocator system 210 iteratively adjusts locations of the trend point, which improves accuracy of the geolocation process.

As further shown in FIG. 4, process 400 may include storing and/or providing information identifying the set of call segments and the corresponding set of segment locations (block 450). For example, geolocator system 210 may store and/or provide information identifying the set of call segments and the corresponding set of segment locations. In some implementations, geolocator system 210 may store the set of segment locations locally. In some implementations, geolocator system 210 may provide the set of segment locations to another device (e.g., based on a request for the segment locations, periodically, etc.).

In some implementations, geolocator system 210, or another device (e.g., network resource 245, a self-optimizing network or self-organizing network (SON) system, etc.), may determine configuration actions to perform to cause one or more base stations 220 to be adjusted based on information identifying segment locations. For example, geolocator system 210 may determine one or more configuration actions to be performed (e.g., by base station 220), with regard to an uplink, to update a power level, to update a cell geometry, to update a signal modulation/coding scheme, or the like. The configuration action may include, for example, modifying transmitted power levels, neighbor cell relation tables, antenna electrical tilts, antenna mechanical tilts, antenna pointing direction/angles (e.g., elevation, tilt, and/or azimuth), handover thresholds, or the like. In some implementations, geolocator system 210 may recommend deactivating one or more base stations 220 and/or activating one or more base stations 220. In this way, geolocator system 210 may determine configuration actions to perform with regard to one or more base stations 220 based on the segment locations and, thereby, improve mobile network performance.

In some implementations, geolocator system 210, or another device (e.g., network resource 245, a self-optimizing network or self-organizing network (SON) system, etc.), may determine configuration activities to perform with regard to mobile device 230. For example, based on the segment locations of a call placed by mobile device 230, geolocator system 210, or another device (e.g., network resource 245, etc.) may cause mobile device 230 to increase or decrease a transmit power level, increase or decrease a metric reporting threshold (e.g., a threshold value of a metric at which mobile device 230 reports the value of the metric to mobile network 240 or another device), increase or decrease a handover threshold, modify handover parameters, increase or decrease an inter-radio-access-technology (inter-RAT) threshold, switch from a first radio access technology to a second radio access technology, switch from a first channel to a second channel, connect to a particular base station 220, increase or decrease network capacity based on a set of ingress paths or egress paths, increase or decrease network capacity based on a predicted concentration in a particular service area, or the like. In this way, geolocator system 210 improves network performance by causing reconfiguration of mobile device 230.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of determining segment locations of call segments based on a modified multi-swarm approach. For the purpose of FIGS. 5A-5E, assume that a particular call has been placed by mobile device 230. Assume further that mobile device 230 satisfies a movement threshold (e.g., that mobile device 230 connects with a threshold quantity of base stations 220 during the particular call, moves through a threshold quantity of serving cells during the particular call, etc.). Assume further that geolocator system 210 obtains call information identifying call segments of the particular call. Assume that geolocator system 210 determines to perform a modified multi-swarm approach to determine segment locations corresponding to call segments of the particular call.

Figure 5A:
FIGS. 5A-5E are diagrams of an example implementation relating to the example process shown in FIG. 4.
Figure 5B:
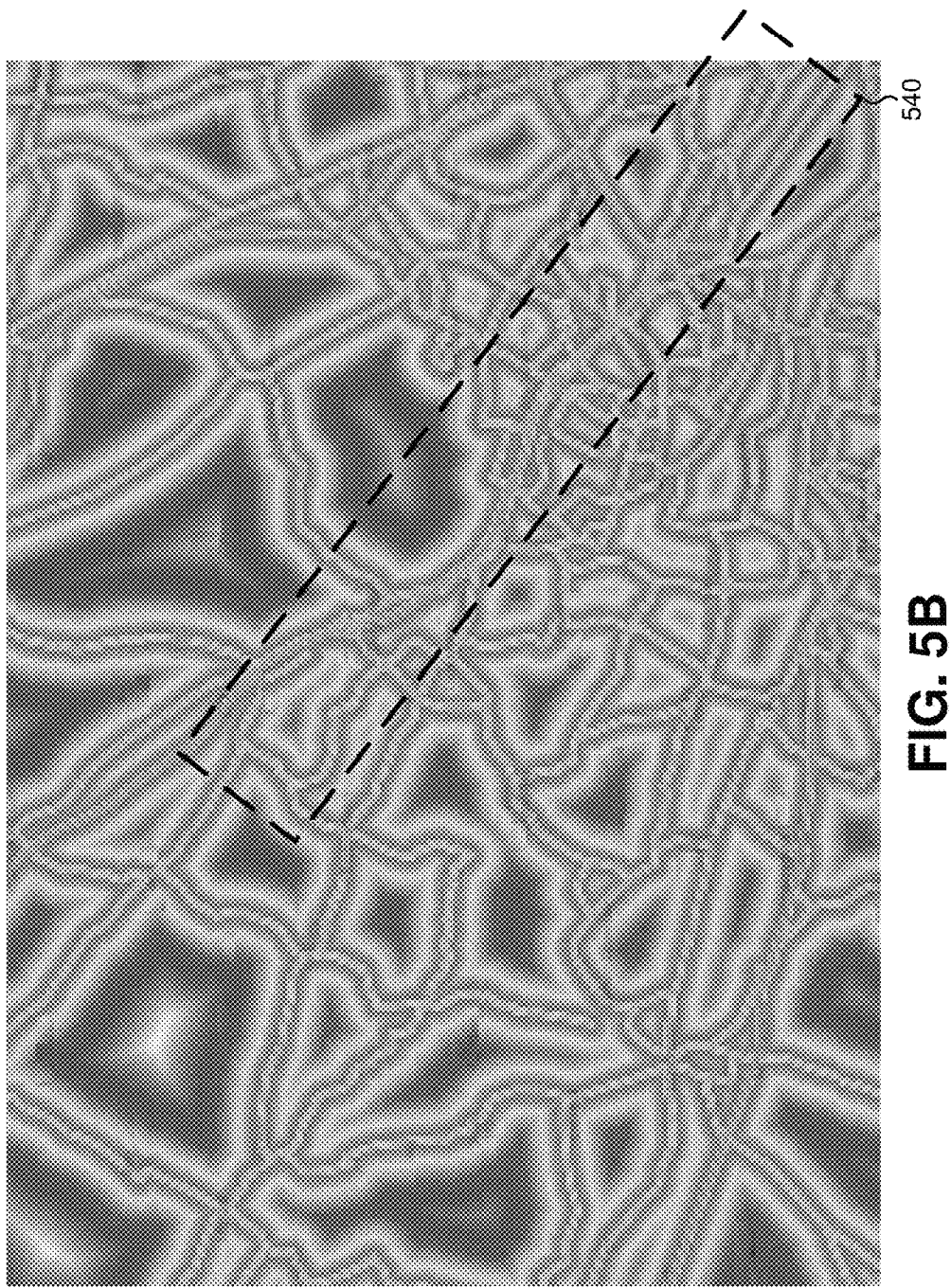

As shown in FIG. 5A, geolocator system 210 (not shown) may generate sets of candidate particles (e.g., shown as circles) corresponding to call segments of the particular call. As shown by reference number 510, candidate particles of a particular call segment are shown as circles within the area defined by reference number 520. As shown by reference number 520, the candidate particles of the particular call segment are generated within a geolocation area (e.g., shown by a shaded area in the shape of a ring). Here, the geolocation area is determined based on a particular propagation delay value, which indicates that mobile device 230 was located within the shaded area during the particular call segment. As shown by reference number 530, other candidate particles for the particular call are scattered, with some of the candidate particles being generated along or nearby a road, and others of the candidate particles being generated some distance from the road.

FIG. 5B shows a probability distribution for roads, which can contribute to the location where the candidate particles are generated by geolocator system 210. The candidate particles generated by geolocator system 210 (e.g., as shown by reference number 510 and 530 of FIG. 5A) are located approximately along the road shown by reference number 540. Geolocator system 210 may use the probability distribution shown in FIG. 5B to generate candidate particles for the call based on the call satisfying the movement threshold. For example, calls that satisfy the movement threshold may be likely to be associated with mobile devices 230 that are located on a road (e.g., in a moving vehicle), so geolocator system 210 uses the probability distribution shown in FIG. 5B to generate the candidate particles.

In some implementations, geolocator system 210 may combine the probability distribution shown in FIG. 5B with other information to generate the candidate particles. For example, geolocator system 210 may partially randomize locations of the candidate particles, may generate the candidate particles based on a combination of the probability distribution shown in FIG. 5B and another probability distribution, or the like.

Figure 5C:

As shown in FIG. 5C, geolocator system 210 may generate a trend line based on the candidate particles. For example, geolocator system 210 may assign scores to each candidate particle, and may generate the trend line based on a best-scoring candidate particle for each call segment. Geolocator system 210 may assign scores, select candidate particles, and/or determine segment locations based on a location of the trend line, as described in more detail elsewhere herein. A best-scoring candidate particle for the particular call segment is shown by reference number 550.

Figure 5D:
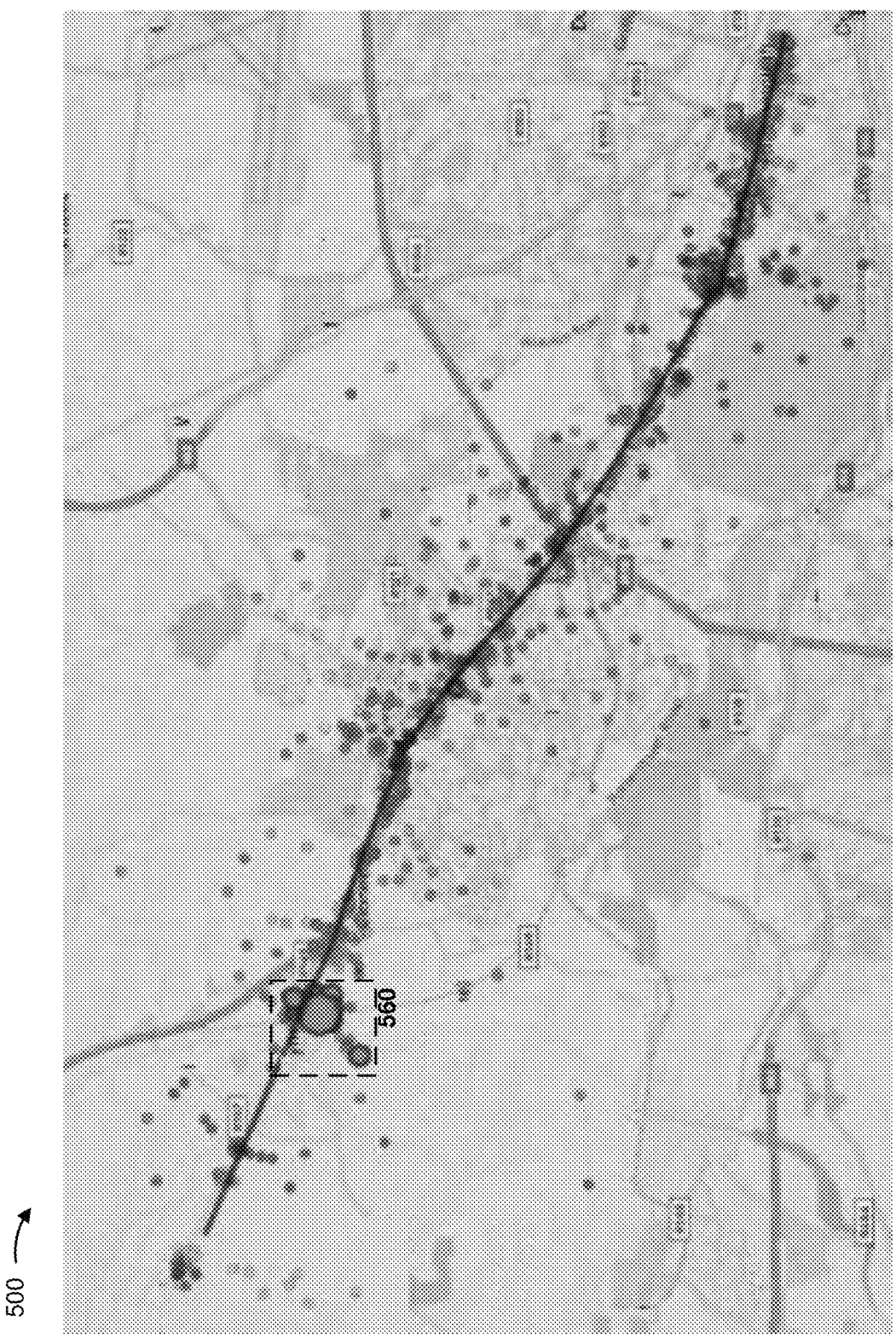

FIG. 5D shows the candidate particles shown in FIG. 5C (e.g., all of the candidate particles shown in FIG. 5C, a subset of the candidate particles shown in FIG. 5C, additional candidate particles other than those shown in FIG. 5C, etc.) after geolocator system 210 performs a first quantity of iterations. As shown in FIG. 5D, geolocator system 210 has updated locations of a majority of the candidate particles to locations that are closer to the trend line as compared to FIG. 5C, and that are closer to the road identified in FIG. 5B.

As shown by reference number 560, the candidate particles associated with the particular call segment have moved closer to the trend line. Here, a best-scoring candidate particle for the particular call segment is shown by a largest circle of the circles shown in FIG. 5D. As further shown, geolocator system 210 has adjusted a location of the trend line as compared to the location of the trend line shown in FIG. 5C. For example, geolocator system 210 may adjust the trend line based on locations of best-scoring candidate particles, for each geolocation area, with regard to the iteration shown in FIG. 5D, which may change a shape and/or location of the trend line.

Figure 5E:

FIG. 5E shows the candidate particles shown in FIGS. 5C and 5D after geolocator system 210 performs a second quantity of iterations. As shown in FIG. 5E, after the second quantity of iterations, the candidate particles and the trend line may be substantially located along the road identified in FIG. 5B. This may indicate that mobile device 230 is likely to have traveled along the road during the call. As shown by reference number 570, the candidate particles associated with the particular call segment may be located on the trend line and/or the road. Geolocator system 210 may determine a segment location for the particular call segment based on the location of the selected candidate particle for the particular call segment, based on an average location of each of the candidate particles associated with the particular call segment, or the like.

As indicated above, FIGS. 5A-5E are provided merely as an example. Other examples are possible and may differ from what was described with regard to FIGS. 5A-5E.

In this way, the geolocator system improves accuracy of location information for calls that include multiple call segments.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device for identifying location of a mobile device during a call, the device comprising:
one or more processors configured to:
obtain call information relating to the call, the call information comprising a plurality of call segments;
perform one or more particle swarm operations to obtain approximate locations of the mobile device during at least some of the plurality of call segments;
where the one or more processors, when performing the one or more particle swarm operations, are configured to:
determine a plurality of geolocation areas corresponding to the plurality of call segments,
a geolocation area, of the plurality of geolocation areas, identifying a geographical area in which the mobile device was located during a corresponding call segment of the plurality of call segments,
generate a swarm of candidate particles, of a plurality of swarms of candidate particles, in each geolocation area, of the plurality of geolocation areas;
determine the approximate locations based on a respective swarm of candidate particles for each respective geolocation area and a probability distribution; and
combine the approximate locations to identify a location of the mobile device during the call.

2. The device of claim 1, where the one or more processors, when determining the approximate locations, are configured to:
assign scores to candidate particles, of the plurality of swarms of candidate particles, based on the probability distribution,
the probability distribution identifying probability values at respective locations within the plurality of geolocation areas,
a probability value for a particular location, of the probability values and the respective locations, identifying a likelihood, relative to likelihoods associated with other locations, that the mobile device was located at the particular location during the call; and
determine the approximate locations based on the scores.

3. The device of claim 2, where the one or more processors, when generating the plurality of swarms of candidate particles, are to:
generate the plurality of swarms of candidate particles based on the probability distribution or based on a random component.

4. The device of claim 1, where the one or more processors, when performing the one or more particle swarm operations, are configured to:
obtain the approximate locations based on measurement information collected by the mobile device or by one or more base stations to which the mobile device connected during the call.

5. The device of claim 1, where the one or more processors, when performing the one or more particle swarm operations, are configured to:
generate a trend line based on a result of a particular iteration of the one or more particle swarm operations,
the trend line being generated based on locations associated with a first plurality of best-scoring candidate particles corresponding to the plurality of call segments,
the first plurality of best-scoring candidate particles being selected from a plurality of swarms of candidate particles corresponding to the plurality of call segments;
select a second plurality of best-scoring candidate particles corresponding to the plurality of call segments, in an iteration of the one or more particle swarm operations that occurs after the particular iteration, based on the trend line; and
obtain the approximate locations based on locations associated with the second plurality of best-scoring candidate particles.

6. The device of claim 5, where the one or more processors, when selecting the second plurality of best-scoring candidate particles, are configured to:
select the second plurality of best-scoring candidate particles based on respective distances between candidate particles, of the plurality of swarms of candidate particles, and the trend line.

7. The device of claim 1, where the one or more processors, when performing the one or more particle swarm operations, are configured to:
identify a previous call segment, of the plurality of call segments, that immediately precedes a particular call segment, or a next call segment, of the plurality of call segments, that immediately follows the particular call segment; and
obtain the approximate location for the particular call segment based on performing the one or more particle swarm operations for the previous call segment or the next call segment.

8. A non-transitory computer-readable medium storing instructions, the instructions comprising:
one or more instructions that, when executed by one or more processors, cause the one or more processors to:
obtain call information relating to a call,
the call information comprising a plurality of call segments;
perform one or more particle swarm operations to obtain approximate locations of a mobile device that participated in the call during at least some of the plurality of call segments,
where the one or more instructions, that cause the one or more processors to perform the one or more particle swarm operations, cause the one or more processors to:
generate a trend point based on a result of a particular iteration of the one or more particle swarm operations,
the trend point being generated based on an average location of a first plurality of best-scoring candidate particles corresponding to the plurality of call segments,
the first plurality of best-scoring candidate particles being selected from a plurality of swarms of candidate particles corresponding to the plurality of call segments;
select a second plurality of best-scoring candidate particles corresponding to the plurality of call segments, in an iteration of the one or more particle swarm operations that occurs after the particular iteration, based on the trend point; and
obtain the approximate locations based on locations associated with the second plurality of best-scoring candidate particles; and
combine the approximate locations to identify a location of the mobile device during the call.

9. The non-transitory computer-readable medium of claim 8, where the one or more instructions, that cause the one or more processors to select the second plurality of best-scoring candidate particles, cause the one or more processors to:
select the second plurality of best-scoring candidate particles based on respective distances between candidate particles, of the plurality of swarms of candidate particles, and the trend point.

10. The non-transitory computer-readable medium of claim 8, where the one or more instructions, that cause the one or more processors to perform the one or more particle swarm operations, cause the one or more processors to:
determine a plurality of geolocation areas corresponding to the plurality of call segments, a geolocation area, of the plurality of geolocation areas, being generated based on a geographical area in which the mobile device was located during a corresponding call segment, of the plurality of call segments;

generate respective swarms of candidate particles in the plurality of geolocation areas;

assign velocities to particular candidate particles, of a swarm of candidate particles associated with the geolocation area, based on a selected candidate particle, of the swarm, that is located in the geolocation area, the selected candidate particle being selected based on one or more criteria, and the velocities being assigned to cause the particular candidate particles to move toward the selected candidate particle;

determine updated locations of the particular candidate particles based on the velocities;

identify a new selected candidate particle, of the particular candidate particles and the selected candidate particle, based on the updated locations of the particular candidate particles and the location of the selected candidate particle; and obtain an approximate location, of the approximate locations, for the geolocation area based on a location of the new selected candidate particle.

11. The non-transitory computer-readable medium of claim 10, where the selected candidate particle is one of a plurality of selected candidate particles corresponding to the plurality of geolocation areas; and where the one or more instructions, that cause the one or more processors to assign the velocities, cause the one or more processors to:

assign the velocities based on another selected candidate particle, of the plurality of selected candidate particles, that is located in another geolocation area, of the plurality of geolocation areas, that neighbors the particular geolocation area.

12. The non-transitory computer-readable medium of claim 10, where one or more criteria include a probability distribution associated with the plurality of geolocation areas.

13. The non-transitory computer-readable medium of claim 10, where the one or more instructions, that cause the one or more processors to determine the plurality of geolocation areas, cause the one or more processors to:

determine the plurality of geolocation areas based on measurement information, the measurement information including at least one of:
a propagation delay value,
a timing advance value,
a round trip delay value,
a distance between a particular base station and one or more neighboring base stations,
a received energy per chip value,
a noise power density value,
a received signal reference quality value,
a received signal code power value,
a received signal reference power value, or
a receiver level (RxLev) value.

14. A method for identifying location of a mobile device during a call, comprising:

obtaining, by a device, call information relating to the call, the call comprising a plurality of call segments;

determining, by the device and based on the call information, a plurality of geolocation areas corresponding to the plurality of call segments, the plurality of geolocation areas identifying respective geographical areas in which the mobile device was located during corresponding call segments of the plurality of call segments;

generating, by the device and in the plurality of geolocation areas, respective pluralities of candidate particles for use to determine respective approximate locations, an approximate location, of the respective approximate locations, identifying an estimated location at which the mobile device was located during the corresponding call segment;

determining, by the device, the approximate locations based on the respective pluralities of candidate particles, the approximate locations being determined based on a particle swarm operation and based on a probability distribution associated with the plurality of geolocation areas; and providing, by the device, information identifying the approximate locations and the corresponding plurality of call segments.

15. The method of claim 14, where determining the approximate locations comprises:

selecting a particular probability distribution for determining the approximate locations based on whether the call satisfies a movement threshold based on at least one of:

the mobile device connecting to at least a threshold quantity of base stations during the call, or the mobile device being associated with at least a threshold quantity of serving cells during the call, or the mobile device moving at least a threshold distance during the call; and determining the approximate locations based on the particle swarm operation and based on the particular probability distribution.

16. The method of claim 14, where determining the approximate locations comprises:

performing a plurality of particle swarm operations corresponding to the plurality of geolocation areas;

identifying a plurality of selected candidate particles corresponding to the plurality of geolocation areas; and determining the approximate locations based on the plurality of selected candidate particles.

17. The method of claim 16, where identifying the plurality of selected candidate particles comprises:

performing a plurality of iterations to identify the plurality of selected candidate particles, an iteration, of the plurality of iterations, for a particular call segment, of the plurality of call segments, comprising:

assigning scores to each candidate particle, of a particular plurality of candidate particles associated with the particular call segment, based on locations of candidate particles, of the particular plurality of candidate particles, and based on the probability distribution, selecting a particular candidate particle, of the particular plurality of candidate particles, based on a score assigned to the particular candidate particle, assigning velocities to other candidate particles, of the particular plurality of candidate particles, based on a location associated with the particular candidate particle, and determining updated locations of the other candidate particles based on the velocities.

18. The method of claim 17, where assigning the velocities comprises:
   identifying a neighboring candidate particle that is associated with a neighboring call segment,
      the neighboring call segment occurring immediately before or immediately after the particular call segment, and
      the neighboring candidate particle being associated with a highest score of another plurality of candidate particles associated with the neighboring call segment; and
   assigning the velocities based on a location associated with the neighboring candidate particle.

19. The method of claim 17, where performing the plurality of iterations comprises:
   determining a particular quantity of iterations to perform,
      the particular quantity being determined based on one or more of:
         a predefined quantity of iterations to perform, or
         a difference between one or more original locations of one or more candidate particles, of the respective pluralities of candidate particles, before a particular iteration, and one or more updated locations of the one or more candidate particles after the particular iteration; and
   performing the particular quantity of iterations.

20. The method of claim 14, where determining the plurality of geolocation areas includes:
   determining the plurality of geolocation areas based on measurement information,
      the measurement information including at least one of:
         a propagation delay value,
         a timing advance value,
         a round trip delay value,
         a distance between a particular base station and one or more neighboring base stations,
         a received energy per chip value,
         a noise power density value,
         a received signal reference quality value,
         a received signal code power value,
         a received signal reference power value, or
         a receiver level (RxLev) value.

* * * * *